(12) United States Patent
Jost

(10) Patent No.: US 6,986,190 B2
(45) Date of Patent: Jan. 17, 2006

(54) METHOD FOR ASSEMBLING A CASE ON A CUSHION

(75) Inventor: Gilbert Jost, Bettange/Mess (LU)

(73) Assignee: Sevic System AG, Neuwied (DE)

( * ) Notice: Subject to any disclaimer, the term of this patent is extended or adjusted under 35 U.S.C. 154(b) by 0 days.

(21) Appl. No.: 10/893,360

(22) Filed: Jul. 19, 2004

(65) Prior Publication Data

US 2004/0262965 A1  Dec. 30, 2004

Related U.S. Application Data

(62) Division of application No. 10/333,404, filed as application No. PCT/EP02/10190 on Sep. 11, 2002.

(30) Foreign Application Priority Data

Sep. 26, 2001 (FR) .................................. 01 12359

(51) Int. Cl.
 *B68G 7/00* (2006.01)
(52) U.S. Cl. .................... 29/91.1; 29/91.5; 29/469; 297/188.07
(58) Field of Classification Search ............. 29/91.1, 29/91.5, 91.7, 450, 453, 454, 469; 297/188.04, 297/188.07, 217.3, 217.6
See application file for complete search history.

(56) References Cited

U.S. PATENT DOCUMENTS

| | | | |
|---|---|---|---|
| 2,633,905 A | 4/1953 | Geldenbaugh | |
| 4,647,980 A | 3/1987 | Steventon et al. | |
| 4,843,477 A * | 6/1989 | Mizutani et al. | ............ 348/837 |
| RE33,423 E | 11/1990 | Lobanoff | |
| 5,010,668 A * | 4/1991 | Zeligson | ............ 40/324 |
| D339,562 S | 9/1993 | Ditzig et al. | |
| 5,267,775 A | 12/1993 | Nguyen | |
| 5,335,076 A | 8/1994 | Reh et al. | |
| 5,507,556 A | 4/1996 | Dixon | |
| 5,529,265 A | 6/1996 | Sakurai | |
| 5,720,515 A * | 2/1998 | Haffner | ............ 297/188.04 |
| 6,669,285 B1 * | 12/2003 | Park et al. | ............ 297/217.3 |
| 6,739,654 B1 * | 5/2004 | Shen et al. | ............ 297/188.04 |
| 6,786,547 B1 * | 9/2004 | Chu | ............ 297/220 |
| 6,883,870 B2 * | 4/2005 | Jost | ............ 297/391 |
| 6,905,167 B2 * | 6/2005 | Jost | ............ 297/188.04 |

FOREIGN PATENT DOCUMENTS

| | | |
|---|---|---|
| DE | 295 18 369 | 1/1996 |
| JP | 2001-47921 | 2/2001 |
| JP | 2001354074 A | * 12/2001 |

* cited by examiner

*Primary Examiner*—Essama Omgba
(74) *Attorney, Agent, or Firm*—Young & Thompson

(57) ABSTRACT

A method for assembling a case (5), such as integral play station, a simple screen for a DVD reader or for a play station, a loudspeaker, on a cushion (2) such as a headrest or a set back cushion, fitted with a protection cover (4) includes fastening the case (5) directly on the protection cover (4), before mounting the cover (4) on the cushion (2).

15 Claims, 3 Drawing Sheets

METHOD FOR ASSEMBLING A CASE ON A CUSHION

CROSS-REFERENCE TO RELATED APPLICATIONS

This application is a division of co-pending application Ser. No. 10/333,404, filed on May 6, 2003. Application Ser. No. 10/333,404 is the national phase of PCT International Application No. PCT/EP02/10190 filed on Sep. 11, 2002 under 35 U.S.C. § 371. The entire contents of each of the above-identified applications are hereby incorporated by reference.

BACKGROUND OF THE INVENTION

This invention concerns a method of assembling a case, such as an integral play station, a simple screen for a DVD reader or for a play station, loudspeaker or other . . . , on a cushion such as a headrest or a seat back cushion; it also concerns the protection cover fitted with the case, for the implementation of this method, as well as the cushion fitted with this protection cover.

DESCRIPTION OF THE RELATED ART

The headrest or the upper sections of the seat backs of automotive vehicles, trains, even airplanes, are sometimes fitted with video cases such as an integral play station, a simple play station screen, LCD screen for a DVD reader, or others . . . enabling the person placed behind the seat thus fitted, for example to watch a film, to watch commercial information notably via radio link, to play games, even to access the Internet network.

The corresponding cushions are composed of a block of synthetic foam inside a protection cover made of fabric, leather or plastic material. They are structured and prepared suitably to accommodate, in fine, the video case; in particular, they comprise an embedding housing of the case and an integral fastening stand.

However, these particularities make the manufacture of the corresponding cushions more difficult, notably because of the necessity to provide internal fastening means, and also because of the particular preparation of the protection cover necessary to accommodate the video case and to obtain a quality finish. In all cases, the accommodation cushions must be designed or modified specifically to enable adaptation of the case.

SUMMARY OF THE INVENTION

This invention purports to simplify the assembly of such a case on the accommodation cushion and to offer means enabling to standardise the equipment of these cushions.

The method according to this invention consists in fastening the case directly on a protection cover, then in mounting said cover on the accommodation cushion.

Obviously, the cushion in question can already be placed inside an original protection cover before receiving the cover fitted with the case.

It should be noted that the term <<case>> used here and in the following description means either a single-piece structure in the form of an electronic console, or a two-part structure composed of an electronic console and a removable embedding receptacle of this console.

Preferably, the case is fastened by enclosing the protection cover between said case and an added-on rigid structure, positioned against the internal face of said cover.

Still according to a preferred embodiment, the method according to this invention consists in providing an opening with appropriate form and dimensions in the protection cover, then in fastening the case on this cover by enclosing the peripheral rim of said opening between said case and the added-on rigid structure, positioned against the internal face of said cover.

The case can be forcibly embedded in the added-on rigid structure which is in the form of a frame. It can also be interconnected with this added-on structure, by appropriate mechanical means. One can also provide for an added-on structure in the form of a frame that is positioned on the contour of the case and fitted with clamping means on said case. One can also contemplate to fasten the added-on rigid structure on the internal face of the protection cover, then to fasten the case on said added-on structure, while enclosing preferably the protection cover between said case and said structure.

According to an embodiment variation, one can fasten directly, by gluing or other, the peripheral rim of an opening made in the protection cover, on the contour of the case, and in particular on a collar protruding from this case.

The invention also concerns the cover of a cushion such as a headrest or a seat back cushion, whereon is fastened a case, and in particular a video case, for the implementation of the method detailed above.

This protection cover is preferably fitted with a case which works together with an added-on rigid structure, arranged against the internal face of said cover, to fasten said case on the peripheral rim of an opening provided previously in said cover.

The case comprises advantageously a protruding collar which extends on the plane or substantially on the plane of its front face, which collar works together with the added-on structure in the form of a frame to enclose the peripheral rim of the opening provided in the cover.

The added-on structure can be in the form of a plane frame or of a tubular frame. In the latter case, it may comprise a protruding collar at its front rim; the rear rim of this frame can also be extended by a bottom wherein is provided an opening to let through the power supply cable(s) of the case.

The case can be interconnected with the added-on structure by latching means or by added-on mechanical means, such as screws or clamping clips.

BRIEF DESCRIPTION OF THE DRAWINGS

But the invention will be better illustrated, without being limited thereto, by the following description of various embodiments, given solely for exemplification purposes and represented on the appended drawings wherein.

DESCRIPTION OF THE PREFERRED EMBODIMENTS

Figure 1:
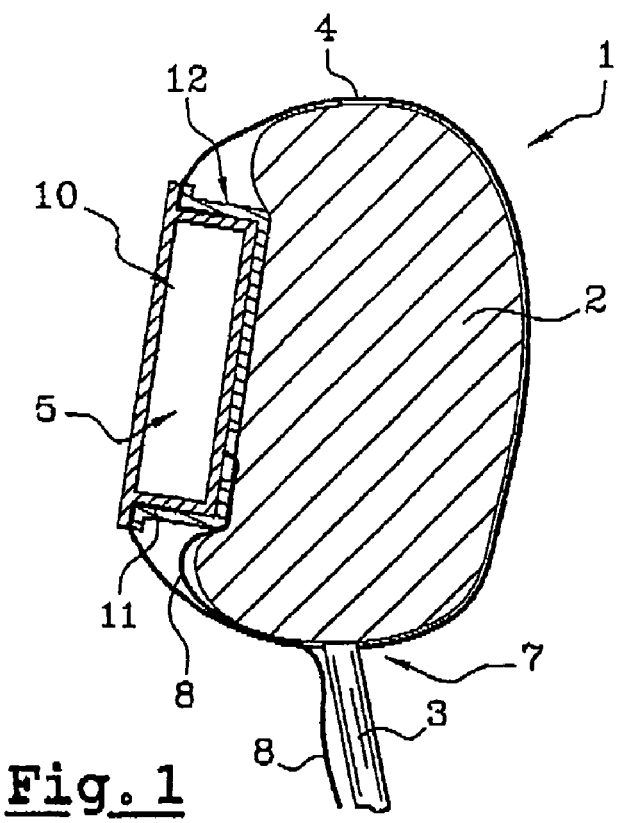
FIG. 1 is a sectional and side schematic view, which illustrates the assembly according to this invention of a case on a seat headrest.

FIG. 1 represents a headrest assembly 1, as a sectional and side view, composed of a cushion of synthetic foam 2 fitted with rods 3 which allow its anchoring on the top of a seat back. The anchoring rods 3 are fastened conventionally on a support stand, not represented, integrated in the foam cushion 2.

The foam cushion 2 is inside a protection cover 4 of appropriate material, for example fabric, leather or plastic material, whereon is fastened a case 5, in particular a video case.

This case 5 is arranged on the rear face of the headrest 1. As indicated previously, this case 5 may consist of a single-piece structure in the form of an electronic console. It can also consist of two sections: one in the form of an electronic console and the other in the form of an embedding receptacle of said console; in the latter case, the console-receptacle assembly can be fastened straightaway on the protection cover, or one can fasten in a first step solely the embedding receptacle, the electronic console being added-on at a later stage.

This case 5 can be in the form of an integral play station; it may also be a simple screen, for example an LCD screen, linked to an electronic console, notably a DVD reader, a play station, or other . . . .

The cover structure 4 is formed to match as well as possible the contours of the cushion 2. Conventionally, it comprises a lower opening 7 which enables its positioning on the cushion 2, which opening 7 is associated with removable closing members, such as elastics, self-hooking bands or simple clamping string for example.

According to this invention, the video case 5 is attached to the protection cover 4 before positioning said cover on the cushion 2.

The front face of the case 5 is situated in the extension or substantially in the extension of the outer surface of the cover, and its rear face is pressed against the rear face of the foam cushion 2, which can slightly be deformed at that level in relation to the pressure applied.

One understands that the foam cushion 2 can be a standard or quasi standard headrest cushion, inside its own original protection cover or not.

If required, a simple recess can be provided in the rear face of this cushion, to integrate at least partially the thickness of the case 5.

Anyway, the case 5 is rigidly maintained in position by stretching the cover 4 which is pressed against the cushion 2.

The possible cable(s) 8 which supply the video case pass through the opening 7 provided in the lower section of the cover 4; they can then run along one of the anchoring rods 3 of the headrest, then enter the seat back to join the power supply source. It should be noted here that if the case 5 consists of a simple screen, this screen can be linked with the electronic console (such as a DVD reader for example) either by means of cables or by radio link.

The case 5 can be fastened on the cover 4 by any appropriate means.

Preferably, one provides an opening or cut-out 10 in the cover 4, whereof the form and the dimensions are suited to those of the case 5; and one fastens this case by enclosing the peripheral rim 11 of said opening 10, between said case 5 and an added-on rigid structure 12, positioned on the side of the internal face of the cover 4.

Figure 2:
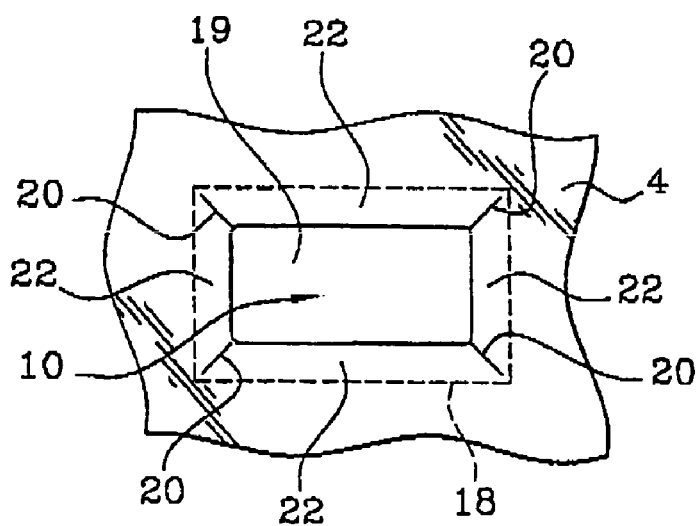
FIG. 2 is a front view which shows the cut-out made in the protection cover for the accommodation of the video case
Figure 3:
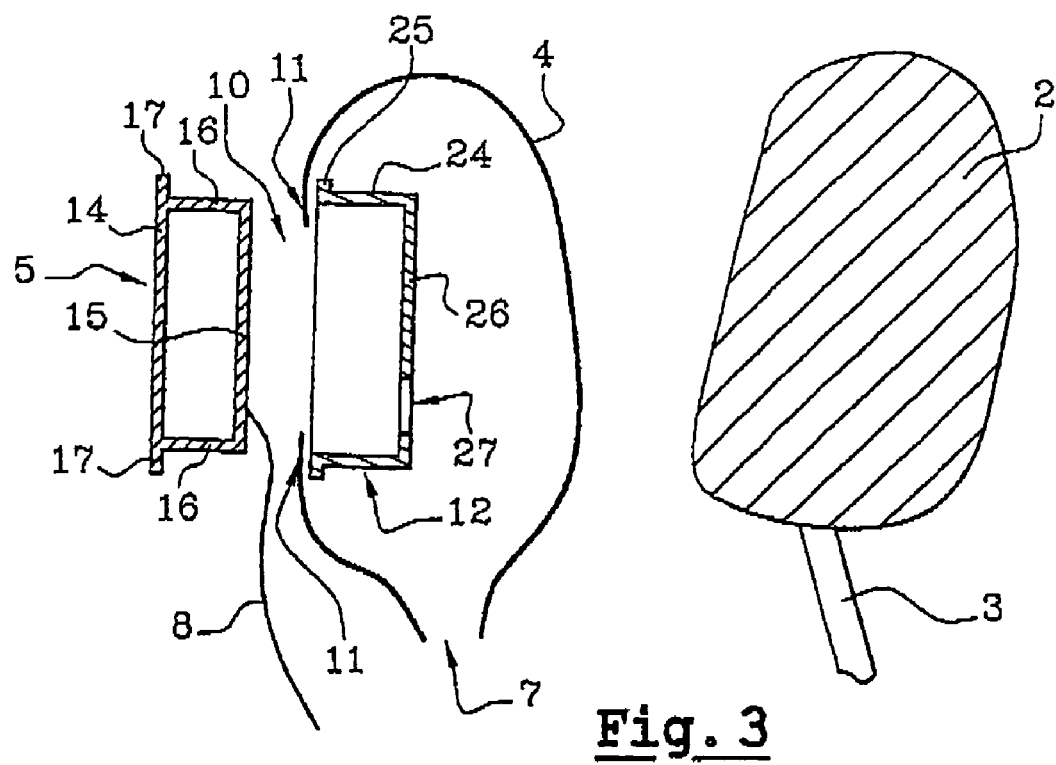
FIG. 3 is a schematic view which shows the different elements of the assembly of FIG. 1, before their assembly.
Figure 4:
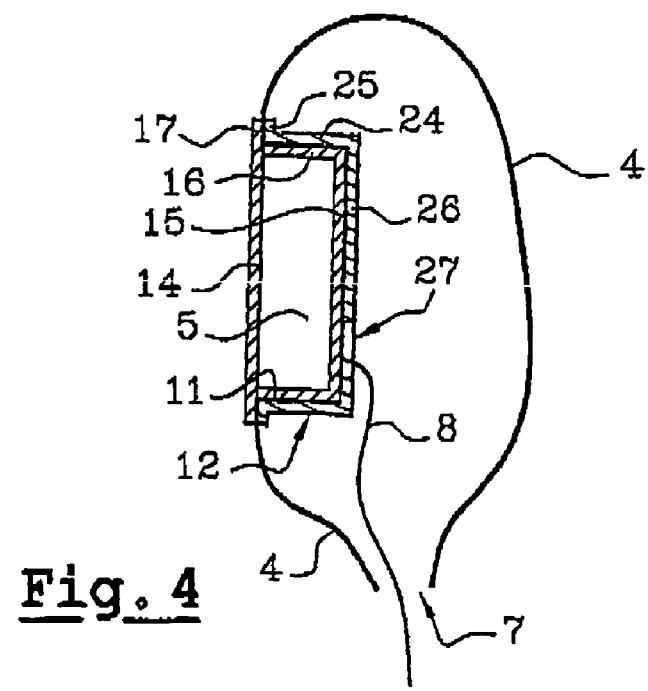
FIG. 4 is a schematic view which illustrates the fastening of the video case on the protection cover, before mounting said cover on the headrest cushion.

This particular type of fastening is detailed on the FIGS. 2 to 4.

The case 5 illustrated on the figures consists of a case in the overall shape of a parallelepiped with a front face 14, a rear face 15 and four side walls 16. These four walls 16 form together a surrounding structure.

The case 5 still comprises a peripheral rim, or protruding collar 17 which protrudes in the extension of the front face 14; this peripheral rim 17 extends perpendicular or substantially perpendicular to the side walls 16.

FIG. 2 illustrates the opening 10 made in the cover 4 to accommodate the case 5. One notices here the general rectangular space requirements of the case illustrated by a dotted line 18. The opening 10 corresponds to a rectangular cut-out 19 of sizes smaller than the general space requirements of the case, associated with four cutting lines 20 which prolong the angles.

One obtains thus four flaps of material 22 forming together the peripheral rim 11 of the opening 10, liable to be enclosed between the case 5 and the added-on rigid structure 12.

On FIGS. 1, 3 and 4, this added-on structure 12 consists of a tubular frame 24, here in the form of a parallelepiped one, whereof the general dimensions are very slightly greater than those of the surrounding structure formed by the four lateral walls 16 of the case 5.

The front rim of this frame 24 comprises here a protruding peripheral collar 25; its rear rim is extended by a bottom element 26.

One notices here the presence of an orifice 27 provided at the bottom 26 of the added-on structure 12, to let through power supply cable(s) 8 of the case 5.

The different parts are assembled by positioning the case 5 and the added-on structure 12 opposite the opening 10 of the cover 4, respectively outside and inside (FIG. 3).

It suffices then to embed the case 5 in the added-on structure 12 while pinching the peripheral rim 11 of the opening 10 of the cover to obtain a convenient assembly.

The leaves or flaps of material 22 which form the peripheral rim 11 of the opening 10 of the cover are enclosed, on the one hand, between both parallelepiped frames 16 and 24, and on the other hand, between the rim 17 and the collar 25, respectively the case 5 and the added-on structure 12. This enclosing or this pinching system enables to maintain the case 5 on the protection cover 4 correctly.

The bottom 15 of the case 5 is in contact or almost in contact with the bottom element 26 of the added-on structure 12.

Obviously, during this assembly, one takes care to run the power supply cable(s) 8 through the orifice 27 of the added-on structure 12, to ensure its integration in the cover 4.

Assembly of the case 5 with the added-on structure 12 and the cover 4 can be made simply by forcible embedding.

Figure 5:
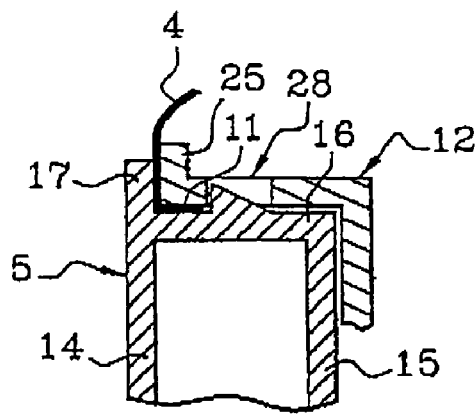
FIGS. 5 to 10 are partial schematic views which illustrate different possible assembly modes of the case on the protection cover.
Figure 6:
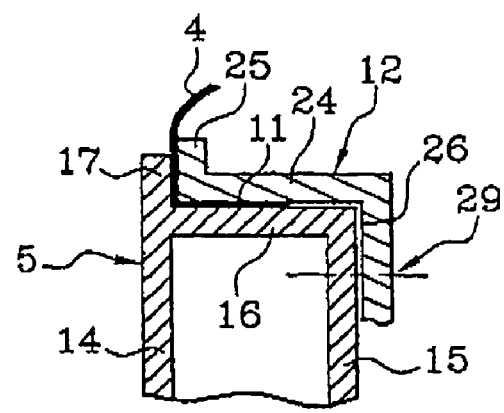

This assembly can also be made by means of appropriate latching members, whereof a possible embodiment is illustrated schematically in 28, on FIG. 5, or still by means of added-on interconnection members, such as screws or clamping clips 29, as illustrated on FIG. 6.

On this FIG. 6, the screws or clamping clips 29 assemble the bottom elements 15 and 26, respectively of the case 5 and of the added-on structure 12; one can also contemplate to assemble in such a way both frames 16 and 24, or still both protruding structures 17 and 25.

Figure 7:
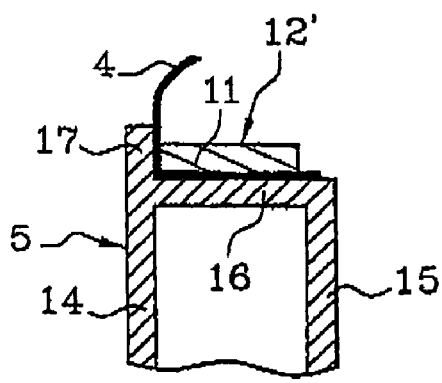

In an embodiment variation illustrated on FIG. 7, the added-on structure can be in the form of a simple tubular parallelepiped frame 12'. There again, the different elements can be assembled by simple forcible embedding, by any appropriate latching means or by added-on interconnection elements such as screws, clips or others.

One can also contemplate to use an open frame, similar to a tightening strap, associated with means which allow clamping said frame on the case 5.

Figure 8:
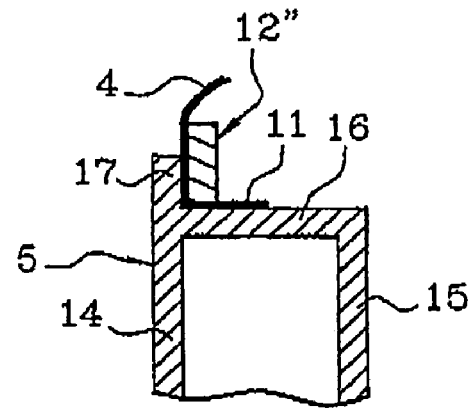

As can be seen on FIG. 8, the added-on structure can also be in the form of a planar frame 12" enclosing the cover 4, in association with the peripheral rim 17 of the case 5.

Figure 9:
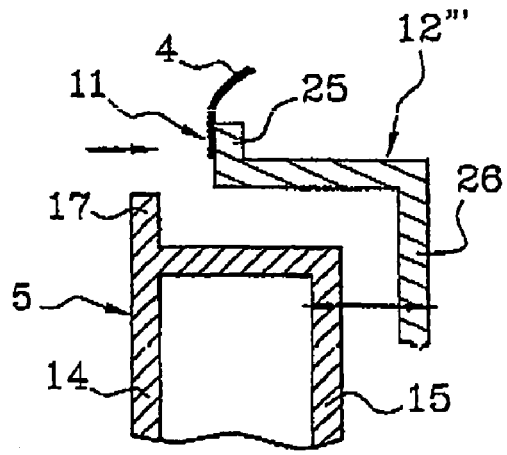

In another possible embodiment, illustrated on FIG. 9, the front rim of the added-on structure 12''' can be fastened to the internal face of the cover 4, before interconnection between said added-on structure 12''' and the case 5. In this case, the peripheral rim 11 of the opening 10 of the cover 4 can be fastened to the added-on structure 12''' for example by gluing, by means of an appropriate glue or using a thermofusion technique.

Interconnection between the added-on structure 12''' and the case 5 can here be performed by any appropriate means such as those listed and presented above.

During interconnection between the case 5 and the added-on structure 12''', the protection cover 4 is preferably pinched to optimise the assembly of the different elements.

Figure 10:
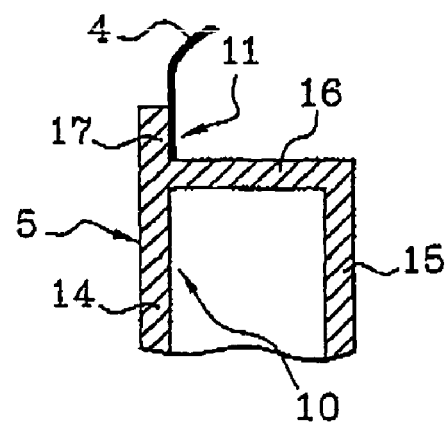

In another possible embodiment, schematised on FIG. 10, the peripheral rim 11 of the opening 10 of the cover can be directly fastened by gluing or other, on the collar 17 of the case 5; this enables then to dispense with the presence of an added-on structure 12.

According to the technique adopted, if it enables to facilitate handling, the case 5 can be fastened to the cover 4 after turning over said cover.

Once the protection cover 4 is fitted with the case 5, said cover can be mounted on the headrest cushion 2 quite conventionally.

A case can be mounted on a seat back cover similarly, in order to equip the upper section of the seat back.

It should also be noted that the assembly principle of this invention can be applied for adaptation on the protection cover of loudspeakers, remote control support(s) or other devices of the same type.

What is claimed is:

1. A method of assembling a case on a cushion of a headrest or a seat back cushion, comprising the steps of:
    providing a cover opening with an appropriate shape and dimensions in a flexible protection cover, said cover opening having a peripheral rim;
    fastening said case directly on the peripheral rim by enclosing said cover between a collar protruding from said case and an added-on rigid structure positioned against an internal face of said cover, an external face of said cover being positioned against said case and against the collar, the case fastened on the peripheral rim of the cover opening; and
    after fastening said case on said cover, then mounting said flexible cover on and surrounding said cushion.

2. A method according to claim 1, wherein the added-on structure comprises a frame, said case directly fastened to said frame by mechanical means.

3. A method according to claim 1, further comprising:
    first fastening the added-on rigid structure on the internal face of the protection cover,
    then fastening the case on said added-on structure while enclosing the protection cover between said case and said added-on structure.

4. A method according to claim 1, wherein, the added-on structure comprises a frame which is placed on a contour of said case and which is fitted with clamping means on said case.

5. A method according to claim 1, further comprising fastening the case on the protection cover by forcibly embedding said case in the added-on rigid structure, the added-on rigid structure comprising a frame.

6. A method according to claim 1, further comprising fastening directly the peripheral rim of the cover opening on the collar protruding from the case.

7. A method according to claim 1, wherein, the rigid structure is positioned against an internal face of the peripheral rim.

8. A method according to claim 7, wherein, an external face of the peripheral rim is positioned against the case and against the collar.

9. A method of assembling a case on a cushion, comprising the step of taking
    i) a foam cushion,
    ii) a protection cover with a peripheral rim defining a cover opening,
    iii) a case with a protruding collar, and
    iv) a rigid structure; and
    locating the rim between the collar and the rigid structure with an internal face of the rim and the collar laid against the rigid structure, the case and rigid structure pinch-holding the rim intermediate the collar and the rigid structure.

10. The method of claim 9, wherein, the cushion is provided with rods protruding from a lower surface.

11. The method of claim 10, comprising the further step of covering the cushion with the cover.

12. A method of assembling a case on a cushion, comprising the step of, with a protection cover with a peripheral rim defining a cover opening, a case with a protruding collar, and a rigid structure, pressing the case into the rigid structure to locate the rim between the collar and the rigid structure with the collar pinching an internal face of the rim against the rigid structure, the case and rigid structure pinch-holding the rim intermediate the collar and the rigid structure.

13. The method of claim 12, comprising the further step of covering a cushion with the cover.

14. The method of claim 13, comprising the further steps of:
    obtaining the case as a single-piece structure in the form of an electronic console;
    obtaining the cushion with rods protruding from a lower surface.

15. The method of claim 14, comprising the further step of:
    obtaining the cushion as a headrest cushion.

* * * * *